(No Model.)
C. JUSTESEN.
FEED TROUGH.
No. 423,777. Patented Mar. 18, 1890.
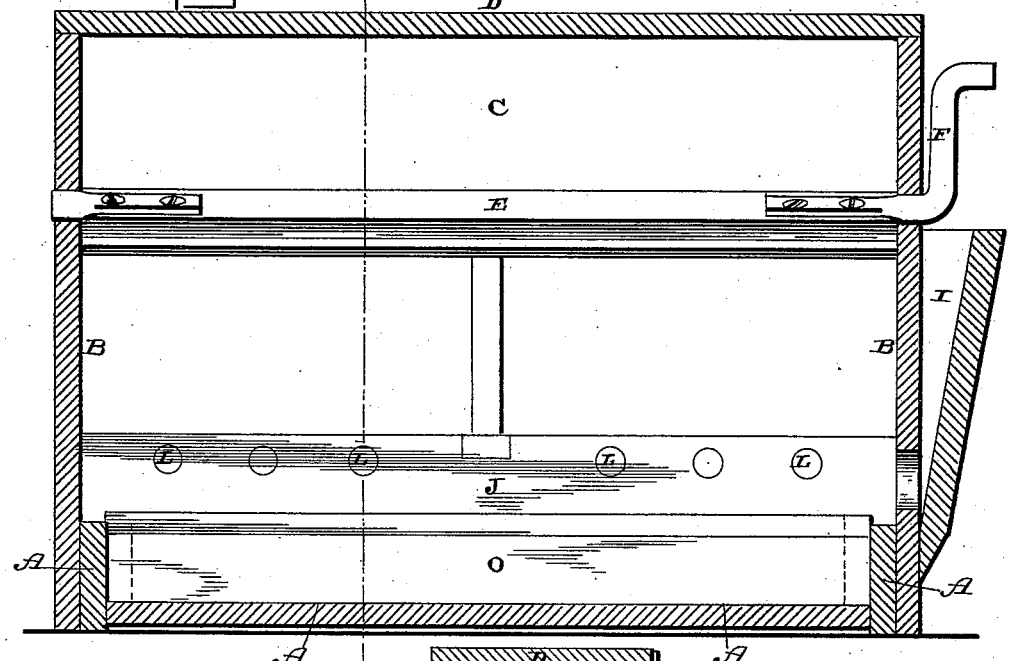
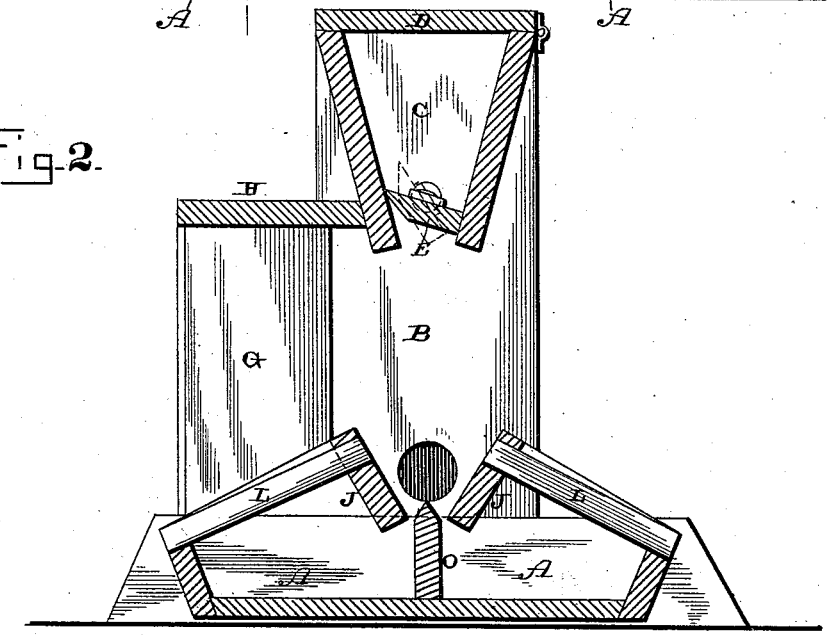
Witnesses:
E. P. Ellis
L. J. Magie
Inventor:
Chris Justesen
per
F. W. Lehmann, atty

UNITED STATES PATENT OFFICE.

CHRIS JUSTESEN, OF AUDUBON, IOWA.

FEED-TROUGH.

SPECIFICATION forming part of Letters Patent No. 423,777, dated March 18, 1890.

Application filed December 7, 1889. Serial No. 332,880. (No model.)

*To all whom it may concern:*

Be it known that I, CHRIS JUSTESEN, of Audubon, in the county of Audubon and State of Iowa, have invented certain new and useful Improvements in Feed-Troughs; and I do hereby declare the following to be a full, clear, and exact description of the invention, such as will enable others skilled in the art to which it pertains to make and use it, reference being had to the accompanying drawings, which form part of this specification.

My invention relates to an improvement in feed-troughs; and it consists in the particular construction hereinafter more fully described, and particularly pointed out in the claim.

Figures 1 and 2 are vertical sections of a trough which embodies my invention, taken at right angles to each other.

A represents the trough from which the feed is eaten by the animals, and rising from each end of this trough are the standards B, which support between their upper ends the trough C, in which the feed is placed. This trough is provided with a cover D at its top to keep out the rain and snow, and with a pivoted valve or board E for the purpose of regulating the discharge of the feed from the trough. The handle F, connected to this valve or board, projects outside of the end of the trough, so as to be readily operated at any time. Also rising from the end of the trough A are the standards or supports G, upon the top of which is placed the board H, upon which the operator walks, so as to keep from having to walk between the animals. If the trough is placed close to the fence which surrounds the hog-yard, the operator can mount upon this board H, and thus never be troubled by the animals he is feeding. Placed at one end of this frame, and preferably next to the fence, is a spout, funnel, or conductor I, which extends along down the side of the standard B, and through which the slop or water is poured. This slop or water runs through an opening in the end of the standard B into the trough A below. Placed between the two standards B, and extending horizontal and parallel with the trough A, are the two inclined boards J, which both serve to catch the feed which is falling from the trough C and as supports for the bars L, which separate the animals while eating. The lower edges of these boards are separated any suitable distance apart and placed in the center of the trough A, and midway between these two inclined boards is the partition O, which is provided with a sharp edge, so as to separate the feed as it falls upon it. This board is made removable, so that the trough need not be divided at its center unless so desired. If the food is soft wet food, which will readily separate over the bottom of the trough A, this division-board may be dispensed with, but not otherwise. The outer ends of the division-bars are supported upon the outer sides or edges of the trough A, and these bars can be removed at any time by removing the nail or other fastening devices which are passed through their outer ends.

With the division-bars removed the ice can be readily removed from the trough in the winter and the trough cleaned out, and with the division-bars in position the animals are prevented from crowding each other and cattle are prevented from eating the food which is intended for the hogs.

Having thus described my invention, I claim—

In a hog-trough, the combination, with the bottom trough A, which rests upon the ground, having the central vertical longitudinal partition secured to the bottom thereof, of the vertical wide transverse standards extending from each end thereof, longitudinal inclined boards having their ends secured to the inner sides of the said standards at their upper ends, which together form a trough, the pivoted bottom, longitudinal outwardly-inclined boards having their lower edges adjacent to the said partition, division-bars which have their ends connected, respectively, to the sides of the trough and the upper edges of the inclined boards, and supports extending upward from the ends of said trough, having a longitudinal board secured to their upper ends, which forms a walk, substantially as shown and described.

In testimony whereof I affix my signature in presence of two witnesses.

CHRIS JUSTESEN.

Witnesses:
ERNEST MIKKELSEN,
JOHN C. JENSEN.